United States Patent [19]

Hoof

[11] 4,103,534

[45] Aug. 1, 1978

[54] HIGH ENERGY LOSS DISK STACK TESTING APPARATUS

[75] Inventor: Robert Grant Hoof, Irvine, Calif.

[73] Assignee: Control Components, Inc., Irvine, Calif.

[21] Appl. No.: 803,171

[22] Filed: Jun. 3, 1977

[51] Int. Cl.² ............................................. G01M 3/02
[52] U.S. Cl. ..................................................... 73/37
[58] Field of Search ............................... 73/37, 38, 40

[56] References Cited

FOREIGN PATENT DOCUMENTS 181,855  6/1966  U.S.S.R. ...................................... 73/37

Primary Examiner—Richard C. Queisser
Assistant Examiner—Joseph W. Roskos
Attorney, Agent, or Firm—Vytas R. Matas; Joseph M. Maguire

[57] ABSTRACT

A testing apparatus is provided for comparative testing of disk passage resistance of various disks in a high energy loss disk stack to detect blocked, broken down or irregularities in the various disks or individual passages thereof. The testing apparatus includes a plug which is sealably movable within a central core of the disk stack to supply air to labyrinth passageways formed at predetermined stack heights by aligning an air outlet on the plug with the labyrinth passageways formed at that stack height. The plug is connected to a pressure gauge calibrated to indicate a normal range of labyrinth resistance. Readings below the normal range indicate broken down or low resistance labyrinths while readings above the normal range indicate high resistance or blocked labyrinths.

10 Claims, 4 Drawing Figures

HIGH ENERGY LOSS DISK STACK TESTING APPARATUS

BACKGROUND OF THE INVENTION

1. Field of the Invention

The present invention relates to testing apparatus generally and particularly to testing apparatus for testing labyrinth passageways formed in a disk stack of a disk valve for proper labyrinth resistance to fluid flow.

2. Description of the Prior Art

High energy loss in pressurized fluids is usually provided by disk stacks having a central inlet for fluid flow and a peripheral outlet for fluid exhaust. The inlet and outlet could also be reversed. The disk stack has individual disks which subdivide the fluid into a plurality of individual streams in respective passageways which passageways provide a labyrinth type tortuous multi-turn path having a large length to diameter ratio to impart high frictional resistance losses to the fluid flow as it flows between the inlet and the outlet of the disk stack. The tortuous paths of the disk stack may be provided by individual disks having the tortuous path etched onto the face of each disk to allow a multi-turn flow of the fluid with the turns being confined to the face of the disk. An example of such a high energy loss disk may be found in U.S. Pat. No. 3,514,074. The tortuous paths may also be formed by placing together a series of perforated disks to provide for multi-turns of the fluid between the faces of the stacked perforated disks. An example of such a disk stack may be found in U.S. Pat. No. 3,513,864.

During manufacture of such mentioned disk stacks it will be understood that perforated disks may be improperly aligned into the stack thereby preventing flow between the planes of adjoining disks and a blocked condition may arise. Also etching may be improperly performed on etched disks resulting in either blocked or open labyrinths. Also after long term operation of the disks stack dirt particles and other contaminants may get trapped and build up within the labyrinths to eventually restrict the passageways making certain disks of the disk stack inoperative. Thermal differentials may also cause some of the disks to warp providing short circuits across the labyrinths and an ineffective disk stack.

Since the disk stack is either bolted together or brazed into a single unit, it is highly desirable to know whether the individual disks of the disk stack are operative or inoperative and if operative, whether the energy loss provided by the individual disks is within an acceptable range. To date, the only check on individual disks had to involve the disassembly of the disk stack once its overall operation was suspected and the replacement of the individual disk stacks which proved faulty. A device was needed which could determine which disks were faulty in a stack to evaluate need for repair or replacement and for possible in-stack repair.

SUMMARY OF THE INVENTION

The present invention is directed to a testing apparatus for disk stacks having labyrinth passageways formed at different heights of the disk stack. To accomplish this, a plug member is made sealably movable within a central bore of the disk stack and the plug member is provided a passageway formed in it to supply fluid to the inlet of the labyrinth passageway proximate to the plug member. The passageway in the plug member is connected to a fluid supply for providing pressurized fluid to the plug member. An indicator is connected to the supply to indicate the pressure of the fluid flowing from the supply to the passageway of the plug member and through the adjacent labyrinth passageways. Thus, the proper resistance of the individual labyrinth passageways may be checked by monitoring of the labyrinth backpressure as indicated by the indicator.

In one particular embodiment of the invention, the plug member has a series of vertically spaced notches formed therein with the spacing between notches being substantially identical to the spacing between individual labyrinth passageways formed along the height of the disk stack. Thus, the vertical grooves on the plug provide an indication of alignment between the circumferential groove of the plug member and the labyrinth passageway.

In view of the foregoing it will be understood that one aspect of the present invention is to provide a testing apparatus for disk stacks having labyrinth passageways formed at different heights of the disk stack whereby individual labyrinth passageways may be checked for proper operation.

Another aspect of the present invention is to provide a testing apparatus for disk stacks whereby the proper orientation between the plug member and a particular labyrinth passageway formed in the disk stack may be indicated.

These and other objects of the present invention will be more fully understood upon a consideration of the following description of the preferred embodiment and the drawings.

DESCRIPTION OF THE PREFERRED EMBODIMENT

Figure 1:
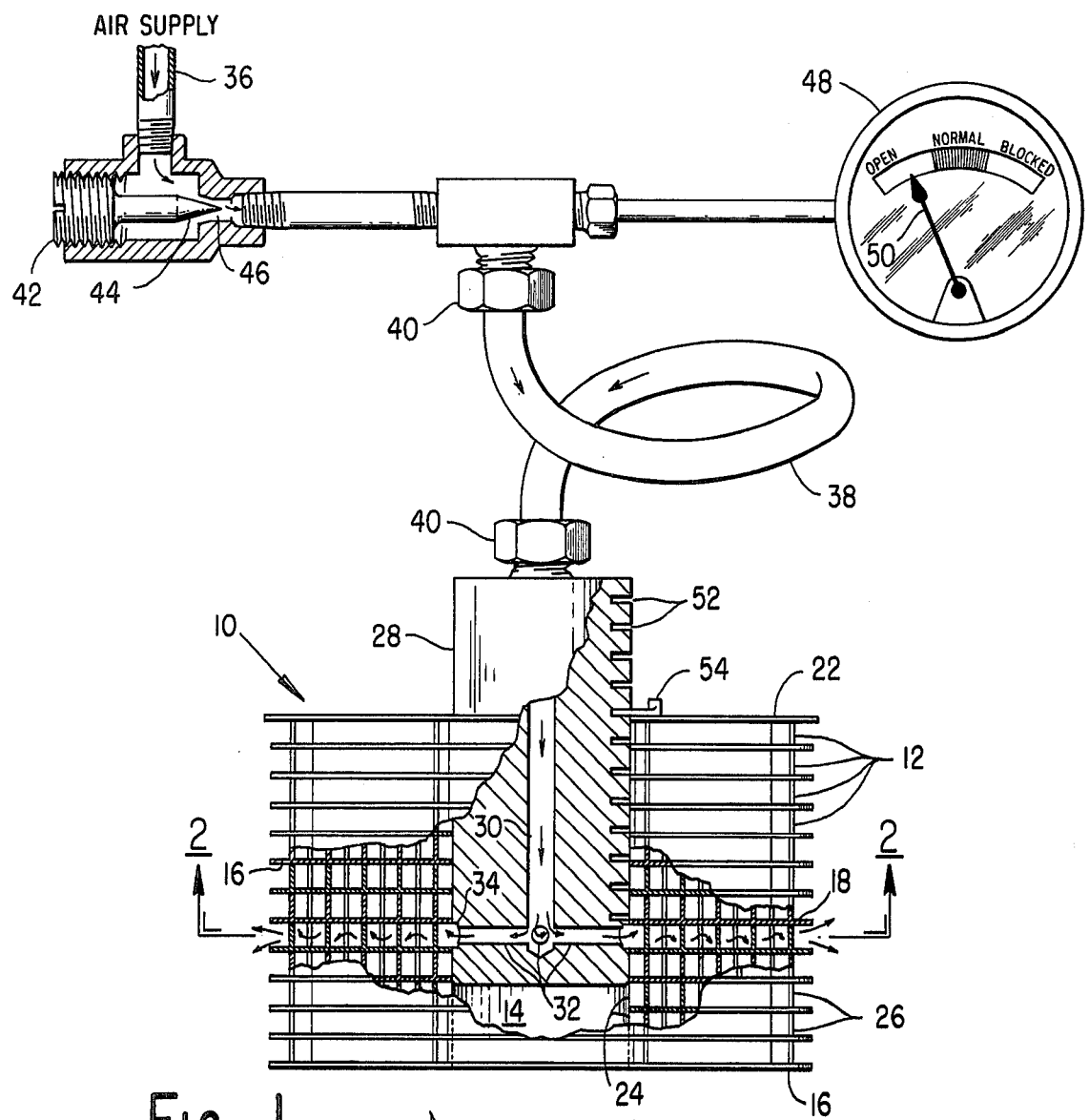
FIG. 1 depicts the testing apparatus of the present invention mounted within a disk stack.
Figure 2:
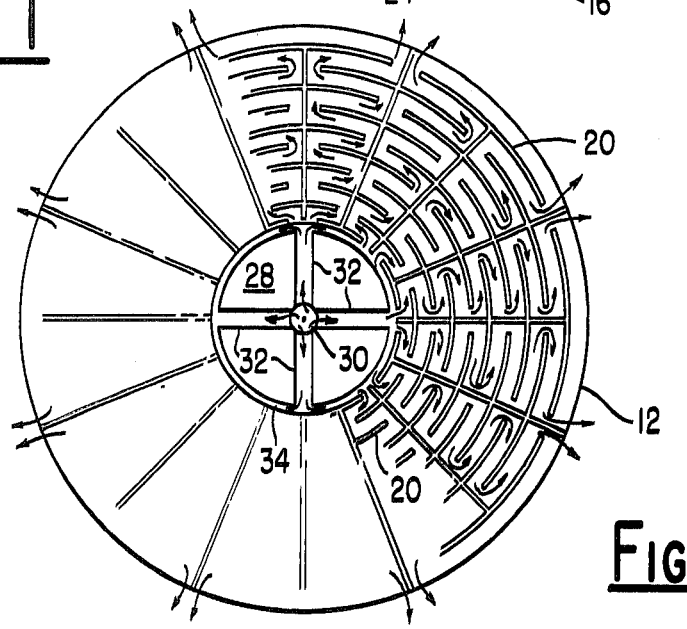
FIG. 2 depicts a cross-section of the FIG. 1 embodiment taken along Section 1—1.

Referring now to FIGS. 1 and 2 of the drawings, a high energy loss disk stack 10 is shown to be formed from a series of disks 12 being substantially circular in geometric configuration and having a central circular opening 14 therein. Each disk 12 has a flat bottom face 16 and a top face 18 on which a series of interlapping fence structures 20 are etched. The disks 12 are stacked to have the flat face of one disk mounted against the etched face of the adjacent disk 12 to thereby seal the fence structures 20 therebetween. This stacking of disks allows the disk stack 10 to be of any desired increment of disks 12 mounted on top of each other and terminating with a flat top cover plate 22 which seals the fence structure 20 of the end etched disk 12. Various means are used to rigidly hold the disk stack 10 together such as brazing of the individual disks, clamping of the individual disks through appropriate nut and bolt assemblies, and other means.

By means of this type of structure, the disk stack 10 provides a circular opening 24 forming the inlet to each of the disks 12 which allows high pressure fluid to enter the fence structure 20 of each disk 12 wherein it goes through a series of turns within the plane of the disk by having to negotiate the fence structure 20 before it is exhausted through the outer periphery 26 of each disk 12. As is known, this travel of the fluid through the tortuous multi-turn path provided by the fence structure 20 significantly drops the pressure of the fluid between the inlet 24 and outlet 26.

A plug member 28 is made to sealably fit the central opening 14 of the disk stack 10 and is made to be movable therein. The plug member 28 has a central passageway 30 which communicates with four radial passageways 32 located near the bottom of the plug member 28. The four radial passageways 32 all lead to a circumferential groove 34 formed along a circumference of the plug member 28 and being of substantially the same height as that of an individual disk 12. The passageway 30 is connected to a pressure regulated fluid supply 36 through a flexible tube 38 sealably connected to the passageway 30 by means of compression nuts 40; thus, pressurized air is communicated to the entire inlet 24 of whatever plate 12 the circumferential groove 34 happens to be aligned with. The pressure of the air supply 36 may be adjusted by a plug 42 which adjusts a needle valve 44 to restrict a passage 46 thereby varying the pressure of the air supplied from the supply 36 to the passageway 30 of the plug member 28. A pressure gage 48 is also connected to the outlet of the passageway 46 to monitor the pressure supplied by the air supply 36 to the passageway 30. Thus, the pressure gauge 48 will monitor the amount of backpressure provided by the disk 12 which is aligned with the circumferential groove 34 of the plug member 28. If the fence structure 20 on the particular plate 12 is of proper construction, the backpressure should be the normal backpressure associated with such a tortuous path. In the event that the fence structure has been eroded to where the structure 20 no longer provides for multi-turn labyrinths, the resistance to the pressurized air exiting from the circumferential groove 34 will be minimal and the backpressure will significantly drop. Should the fence structure 20 have become clogged up by contaminant materials or braze from the brazing operation, the fence structure 20 will provide an abnormally high resistance to air flow therethrough and the backpressure will significantly go up and will be noted as such by the gauge 48.

In operation, the gauge 48 and plug member 28 are first calibrated by aligning the circumferential groove 34 with a known disk 12 having a proper fence structure 20. The air supply 36 is adjusted through the plug member 42 until the backpressure read by the gauge 48 falls within the normal range as indicated by the pointer 50. The plug member 28 along with the calibrated gauge 48 and air supply 36 may now be inserted into a disk stack 10 wherein the disks 12 are to be tested. The plug member 28 is inserted completely into the disk stack 10 until the circumferential groove 34 is aligned with the bottommost disk 12.

The plug member is made slightly longer than the disk stack and a series of notches 52 are cut into the plug member 28 along the vertical height thereof to provide an indication of alignment between the circumferential groove 34 and the disk 12. The spacing between notches 52 is set up to be identical to the spacing between disk 12 of the disk stack 10. Thus, when the plug member 28 is all the way down into the disk stack 10 with the circumferential groove 34 aligned with the first disk 12, only the notch 52 closest to the compression nut 40 is exposed as being above the top plate 22 to indicate the alignment of the circumferential groove 34 with the first disk 12. Supply air passes from the air supply 36 through the flexible tube 38 into passageway 30 and therefrom to the circumferential groove 34 by way of the four radial passageways 32. This supplied air enters the entire inlet 24 of the bottom disk 12 and is exhausted throughout the entire fence structure 20 of that disk to be exhausted from the outer periphery 26 of that disk. If the fence structure 20 resistance is comparable to that of the calibrating disk, the backpressure will be identical and the gauge 48 should again read a backpressure within the normal range as indicated by the pointer 50. Should that particular fence structure 20 have deteriorated to where it no longer provides a multi-turn tortuous path for the fluid, the pressure will be significantly lower and the pointer 50 will read such a lower backpressure by indicating an open fence 20 structure condition. On the other hand, should that particular fence structure 20 have become blocked by contaminants, the backpressure will significantly go up and the pointer 50 of the gauge 48 will read an increased pressure indicated as blocked by the pointer 50.

The plug member 28 is next moved up until the top two notches 52 closest to the compression plug 40 are visible above the top plate 22. This indicates that the circumferential groove is now aligned with the second from the bottom disk 12. The similar procedure is performed on that disk 12 to determine whether the fence structure 20 of the disk 12 is normal, opened, or blocked. To insure that the plug member 28 stays aligned with the second disk, a tab member 54 is inserted into the second notch 52 to prevent the plug member 28 from dropping further into the disk stack 10. This procedure is repeated for every disk 12 of the stack 10 until the entire disk stack 10 has been checked. Thus, the exact location of a faulty disk 12 within the stack 10 may be pinpointed.

Should the disk stack 10 have a faulty disk such as a contaminant-blocked disk 12, that contamination may be blown out with high pressure air or cleaning fluid by disconnecting the plug member 28 from the gage 48 and connecting it to a high pressure source or cleaning fluid, repositioning it to the faulty disk 12 and attempting to blow out the contamination by high pressure or clean it out with cleaning fluid. Thus, the entire disk does not have to be disassembled to determine which disk 12 is faulty nor to clean the contaminated disk 12.

Figure 3:
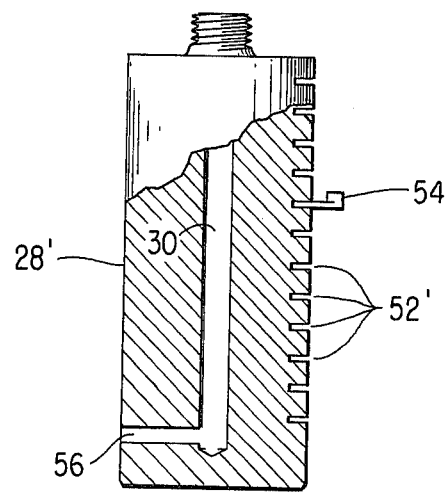
FIG. 3 depicts an alternate passageway formation for the plug member of FIG. 1, suitable for testing individual portions of the labyrinth passageways formed at a particular height of the disk stack.
Figure 4:
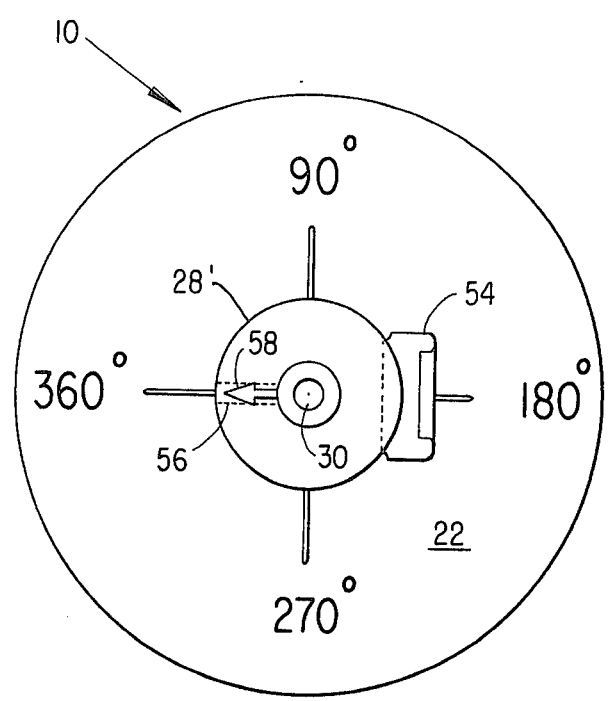
FIG. 4 depicts a top view of the FIG. 3 plug member.

Referring now to FIGS. 3 and 4, it will be seen that the plug member 28 may be modified to provide testing of individual inlet areas of an individual disk 12. To accomplish this only a single radial passageway 56 is connected to the passageway 30' of the plug member 28'. The plug member 28' is again inserted into the disk stack 10 until alignment with the appropriate disk 12 is obtained. Since the plug 28' only has a single radial passageway 56, the air supplied from the air supply 36 thereto by way of passageway 30 is now not exhausted along the entire circular inlet of the disk 12 but is localized to the part of the disk 12 inlet aligned with the radial passageway 56. Thus, only a part of the fence structure 20 of the disk 12 is tested for the opened or the blocked condition. Grantedly, recalibration of the gauge 48 will be required to test a portion of the fence structure 20. However, this calibration may be accomplished in the same manner as was indicated for calibrating the condition of the entire fence structure. The plug 28' is rotated 360° within the position to thereby check the entire fence structure 20 and determine what part of it if any is blocked or opened. To facilitate the location and marking of the faulty fence structure 20, angular indications are marked on the top plate 22 and an arrow 58 is marked on the top of the plug member 28 which is aligned with the internally located radial passageway 56. Thus as the plug member 28 is rotated, the arrow 58 rotates with it and points to a particular angular position on the top plate 22.

Although a particular fence structure 20 on an etched disk has been discussed herein, it will be understood that the present testing apparatus is not limited thereto. High energy loss disks are also known having different etched multi-turn labyrinth passages as well as perforated disks which are overlappingly stacked on each other to provide a multi-turn labyrinth wherein the turns are executed between adjacent perforated disks. The modification of the present testing device to accommodate such different high energy loss disks is considered to be a modification well within the skill of one dealing with the art and will not be discussed in detail herein for purposes of conciseness and readability. However, such modifications are considered to be within the scope of the following claims.

What I claim is:

1. A testing apparatus for testing a disk stack having a central inlet and a peripheral outlet with labyrinth passageways formed in the stack between the inlet and the outlet at different heights of the disk stack to provide a predetermined resistance to fluid flow therethrough comprising:
   a plug member sealably movable in the central inlet of said disk stack, said plug member having a passageway formed therein to supply fluid only to the labyrinth passageways aligned with the passageway of said plug member;
   supply means connected to the passageway of said plug member to provide a supply of pressurized fluid thereto; and
   indicating means connected to said supply means to indicate the pressure of the fluid flowing from said supply means to the passageway of said plug member.

2. A testing apparatus as set forth in claim 1 wherein said disk stack has a series of labyrinth passageways radially extending between the central inlet and the peripheral outlet of said disk stack at different heights of said disk stacks and said plug member has a circumferential groove communicating with the plug member passageway and being alignable with the radial passageways at the different heights of said disk stack to supply fluid to the radial passageways aligned with the circumferential groove.

3. A testing apparatus as set forth in claim 2 wherein said plug member has a series of spaced vertical notches formed therein with the spacing therebetween being substantially identical to the spacing between radial passageways along the height of said disk stack to provide an indication of alignment of the circumferential groove of said plug member with said radial passageways at a predetermined height of said disk stack.

4. A testing apparatus as set forth in claim 3 wherein said indicating means includes a pressure gauge connected between said supply means and the passageway of said plug member having a range indication thereon of pressures normally produced by the resistance to fluid flow of normal labyrinths subjected to fluid flow from said supply means.

5. A testing apparatus as set forth in claim 4 wherein said supply means is an adjustable air supply.

6. A testing apparatus as set forth in claim 1 wherein the passageway of said plug member is formed to include a single radial passage communicating fluid to a localized area of the labyrinth passageways formed at a predetermined height of said disk stack.

7. A testing apparatus as set forth in claim 6 wherein said plug member has a series of markings on the top face thereof indicating the position of the radial passage of said plug member.

8. A testing apparatus as set forth in claim 7 wherein said plug member has a series of spaced vertical notches formed therein with the spacing therebetween being substantially identical to the spacing between radial passageways along the height of said disk stack to provide an indication of alignment of the circumferential groove of said plug member with said radial passageways at a predetermined height of said disk stack.

9. A testing apparatus as set forth in claim 8 including a tab member fitting into any one of the notches formed in said plug to interfere with the top of said disk stack and prevent the further insertion of said plug into said disk stack.

10. A testing apparatus as set forth in claim 9 wherein said tab member has a raised portion extending from the face of said tab member to allow the grasping of said tab member.

* * * * *